(12) United States Patent
Wenstrand et al.

(10) Patent No.: US 7,091,471 B2
(45) Date of Patent: Aug. 15, 2006

(54) USING EYE DETECTION FOR PROVIDING CONTROL AND POWER MANAGEMENT OF ELECTRONIC DEVICES

(75) Inventors: John Stewart Wenstrand, Menlo Park, CA (US); Todd Stephen Sachs, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 101 days.

(21) Appl. No.: 10/801,014

(22) Filed: Mar. 15, 2004

(65) Prior Publication Data

US 2005/0199783 A1 Sep. 15, 2005

(51) Int. Cl.
*H01J 40/14* (2006.01)
*G09G 5/00* (2006.01)

(52) U.S. Cl. .................. 250/221; 345/211; 396/51

(58) Field of Classification Search ............. 250/221, 250/214 R; 351/209, 210; 396/51; 345/211, 345/156

See application file for complete search history.

(56) References Cited

U.S. PATENT DOCUMENTS

| 4,768,088 | A | * | 8/1988 | Ando ..................... 348/77 |
| 5,517,021 | A | | 5/1996 | Kaufman et al. |
| 5,835,083 | A | * | 11/1998 | Nielsen et al. ............ 345/211 |
| 6,082,858 | A | | 7/2000 | Grace et al. |
| 6,163,281 | A | | 12/2000 | Torch |
| 6,259,084 | B1 | * | 7/2001 | Kochis et al. .......... 250/208.1 |
| 6,636,763 | B1 | | 10/2003 | Junker et al. |

* cited by examiner

*Primary Examiner*—Kevin Pyo

(57) ABSTRACT

Eye detection is used as the basis for providing power management or other variations of operational parameters of a controlled device. The system includes an imager and eye detection processing which cooperate to detect light received from a person's eye. The eye detection processing generates an output that can be used for determinations regarding presence of one or more persons or presence of a specific person. This output is used as the basis for switching the controlled device between at least two power consumption states. Eye detection may also be used to allow a person to actively adjust operational conditions of the controlled device, since unnatural eye blinking patterns may be associated with particular commands.

17 Claims, 5 Drawing Sheets

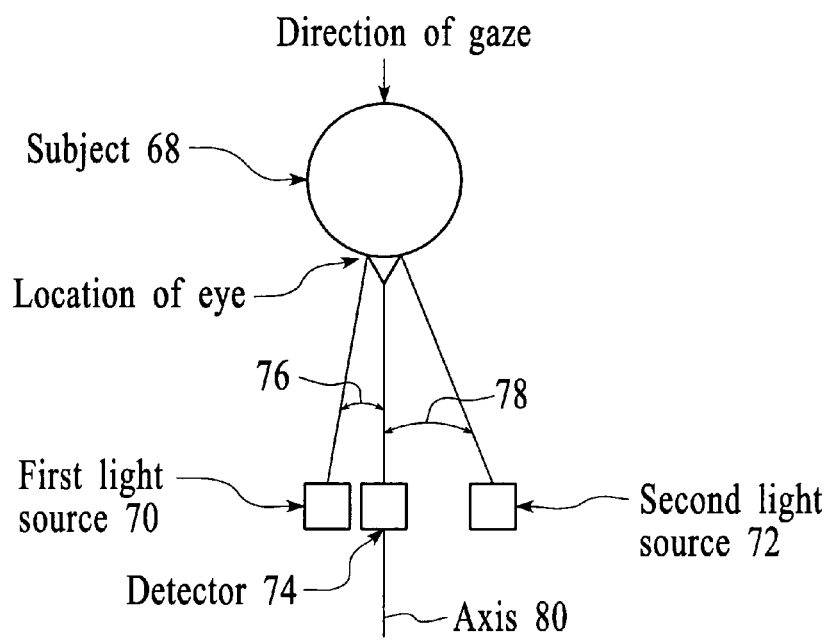
FIG. 6
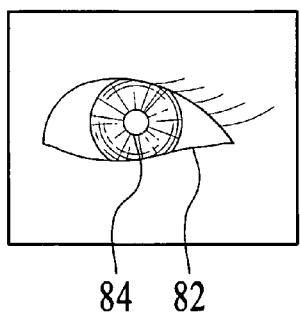 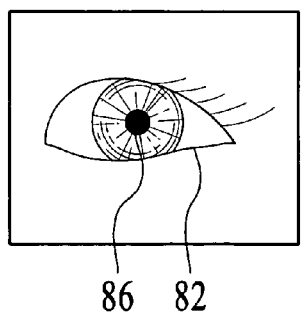 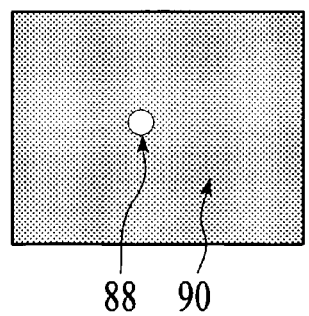
FIG. 7  FIG. 8  FIG. 9

USING EYE DETECTION FOR PROVIDING CONTROL AND POWER MANAGEMENT OF ELECTRONIC DEVICES

BACKGROUND ART

A variety of different types of electronic devices provide utility only when viewed. Examples of these types of devices include televisions, computer monitors, laptop displays, displays for cellular telephones and personal digital assistants, and tablet computer displays.

Some electronic devices that present visual images for human benefit, such as plasma screen televisions, require considerable power. Other devices which present visual images are more energy efficient, but require the use of at least one battery. The batteries are typically rechargeable, but recharging the battery is often inconvenient for the user. Some devices operate in environments in which energy is limited and therefore valuable. Consequently, minimizing power waste is an important product function.

In addition to considerations related to power consumption, there are other benefits which result from limiting operations of electronic devices to those times in which the operation provides utility. One such benefit is that the useful lifetime of the device may be extended. Thus, if an electronic device, such as a plasma screen television, has a finite lifetime expectancy in terms of hours in use, the value of the device over time can be increased by properly regulating the use of the device. This applies to low-cost devices that do not include visual displays, such as light sources. Thus, the useful life of a light inside an oven or closet can be extended if the light is turned "on" only when a person looks through the oven window or looks into the closet.

There are approaches to automatically turning a device "on" and/or "off" at appropriate times. One known technique is to monitor activity by input devices of a computer system. Thus, when there is a prolonged period in which there is no activity at a keyboard or computer mouse, a computer system may be switched to a reduced power state. Then, when the user of the computer system causes movement of the mouse or initiates a keystroke, the system returns to its fully operational state. Many televisions include "sleep" timers in which the television will turn off automatically after a particular period of time. The various known techniques for automatically changing the state of a device operate well for their intended purpose, but include limitations.

Other operational parameters of an electronic device may be adjusted without contacting the device. For example, the volume or channel of a television may be changed using a remote control unit. The unit significantly increases the convenience of making repeated changes to the operational parameters of the device. However, there may be times in which the remote control unit is not readily available, such as when the unit has been misplaced. U.S. Pat. No. 6,163,281 to Torch describes a system and method for communicating with a device using eye movement. Glasses may be specially equipped to include an emitter for directing light towards an eye and to include a sensor for detecting light reflected from the eye. A radio frequency transmitter then transmits a stream of data to a remote location, such as a receiving and processing unit for controlling a device. The stream of data may be a binary signal, such as Morse code. The patent primarily describes the sensor as being a single photocell connected to the frame of the glasses, but states that an array of sensors may be substituted, with the processor accessing the signals from each sensor in the array to create a stream of data indicating the percentage of surface area of the eye covered by the eyelid. The Torch system and method provides advantages relative to the use of the conventional remote control unit, but requires that the optical components be close to the person's eye in order to acquire reliable information.

SUMMARY OF THE INVENTION

A control system utilizes an imager and eye detection processing to enable hands-free control of operational parameters of a device. The method for providing control may be based upon either or both of merely detecting the presence or absence of an eye and detecting specific eye activity. When battery power is a concern, the imager may be sampled non-continuously. with the sampling frequency being selected to conserve battery charge.

In one embodiment, the output from the eye detection processing is connected to a controller that is enabled to switch the device among at least two power consumption states. The controller is configured to execute a switch from one power consumption state to another as a conditional response that includes both a timing consideration and the eye detection consideration. As a first possible conditional response to be executed, the control system switches the device from a power-up state to a lower power consumption state upon passage of a first time period without detecting an eye. As a second possible conditional response, the control system switches the device to the power-up state upon detection of an eye while the device is in a lower power consumption state. Only the presence or absence of an eye is of concern, not the gaze angle (i.e., line of sight) of the person. The device may have more than three power consumption states, such as the power-up state, a sleep state, and a power-off state of a television or other electronic device having a display. If so, the controller may be programmed to execute one or more additional automated responses that are based upon a combination of a timing consideration and an eye detection consideration. The controller may be configured to adaptively adjust the first time period on a basis of factors that include historical data of the occurrences of switching by the controller. For example, the first time period may be adaptively increased on a basis of historical data indicating repeated switching by the controller.

In another embodiment, reliable information regarding eye activity and/or eye presence may be acquired by using first and second light sources, wherein the first light source is positioned to emit light at a first illumination angle that is substantially less than the illumination angle of the second light source. As will be used herein, the "illumination angle" is the angle of the axis of the emitted light to the axis of the imager. The difference in the illumination angles provides a detectable difference in the imaged light from the two sources following reflection from a human eye. In addition to the imager, the two light sources, and the controller, the control system may include a storage of "eye commands," which are correlations between predetermined eye blinking patterns and commands for varying the operational parameters of the device being controlled. The operational parameters which may be varied by eye commands may be related to the power consumption states of the device and/or may be related to other aspects, such as the volume or channel of a television or other video display system.

In a third embodiment, the control system uses frame-to-frame comparisons to acquire reliable information regarding the presence or absence of an eye within the field of view of the imager. First and second frames of image data are generated and then used to form a differential image frame. The techniques for selecting and generating the two frames are designed to provide useful eye-detection data when the two frames are differenced. In applications, the techniques for forming the two frames may be distinguishable with respect to the light sources that are activated in forming the two frames. For example, a first light source may be activated during the generation of the first frame and a second light source may be activated during generation of the second frame, with the two light sources being distinguishable with respect to one or more of the two illumination angles, polarizations, modulation characteristics, and wavelengths. The two frames may be temporally distinguishable, such as when first and second light sources are alternately activated to switch between acquiring a first frame and acquiring a second frame. Alternatively, the two frames may be spatially distinguishable with respect to the pixels of a two-dimensional pixel array, if the pixels are distinguishable with respect to optical properties (using either lenses or physical differences in the pixels themselves) or with respect to electronic techniques for sampling the pixels.

BRIEF DESCRIPTION OF THE DRAWINGS

FIG. 6 is a conceptual view of the employment of a pair of light sources for pupil detection in accordance with the invention.

FIGS. 7, 8 and 9 are images of a human eye captured by the system of FIG. 6.

DETAILED DESCRIPTION

Figure 1:
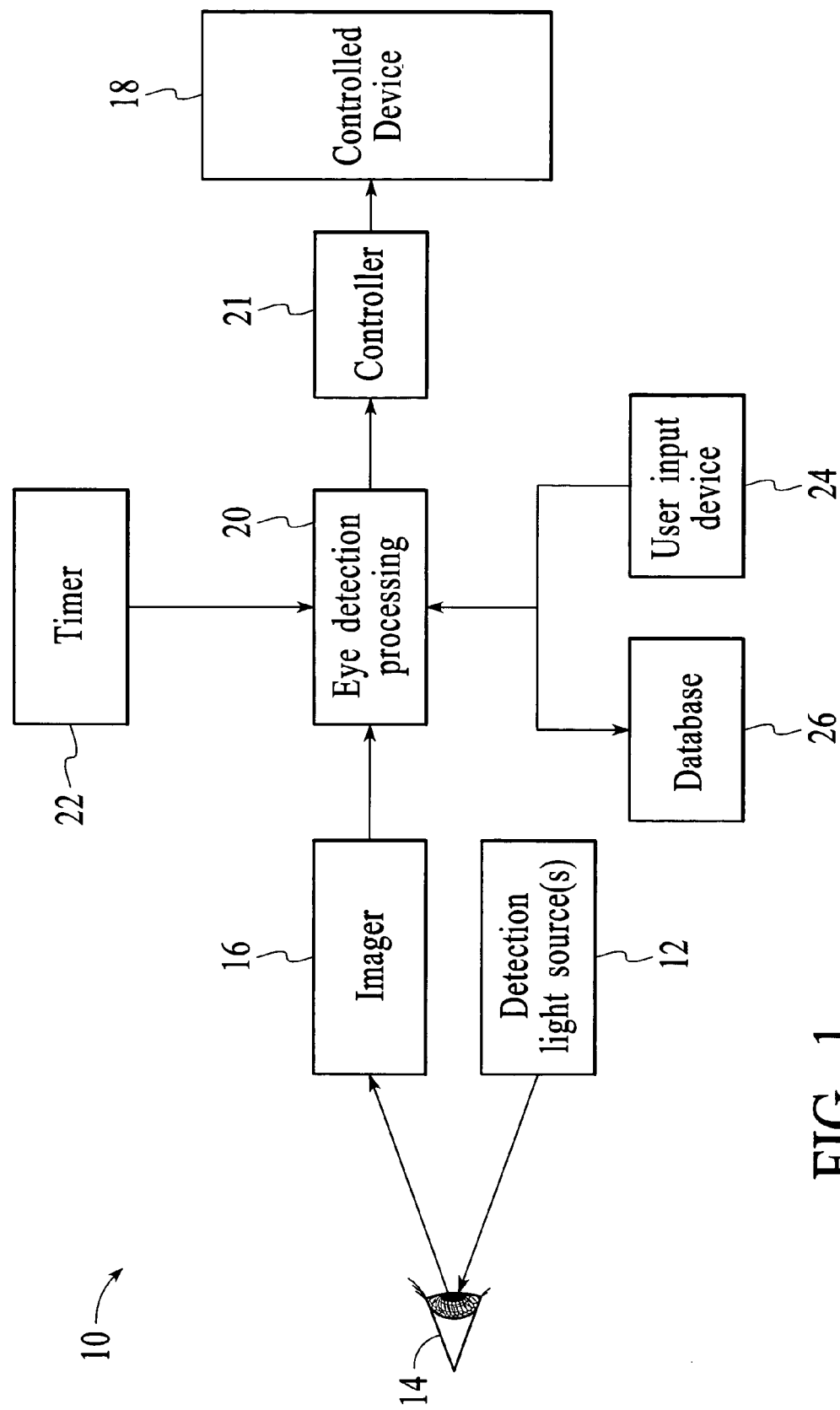
FIG. 1 is a block diagram of components of a control system in accordance with the invention.

With reference to FIG. 1, one embodiment of a control system 10 in accordance with the invention includes a detection light source or light sources 12 directed to illuminate an eye 14 of an individual. In many applications of the invention, it is desirable to minimize the intrusiveness of the system on the individual. For example, when the system is used for regulating power consumption or other operational parameters (e.g., volume and channel) of a television, eye detection is preferably transparent to the persons viewing the television. Thus, each light source may emit light that is outside of the visible light spectrum. Infrared light or near-infrared light is well suited for detecting pupils of a human eye, as will be explained more fully below. In some applications of the system, the detection light source 12 may be omitted, if the targeted feature for detection (the human eye) reflects or generates sufficient light of the detection frequency without the need of a light source dedicated to the system. On the other hand, some embodiments require multiple light sources in order to maximize performance, such as when the light sources are intended to emit light at different illumination angles, wavelengths, polarizations and/or modulation characteristics.

The control system 10 also includes an imager 16 that is positioned to receive light from the eye 14 or eyes of persons within locations of interest with respect to operation of a controlled device 18. The controlled device may be one for which power management is the concern. Alternatively or additionally, other operations can be automatically varied. For power management, the device or a component of the device is switched among at least two power consumption states, depending upon the presence or absence of eye detection (regardless of the person's gaze angle) at a particular time or over a particular time period. The controlled device may have only two power consumption states. As one example, the light that is within an oven may be activated and deactivated depending upon whether a person is positioned to view the interior of the oven. As another example, a television or other video display system may be switched among three power consumption states, namely a powered-up state, a sleep state, and an off state.

A user of the system 10 may provide "passive inputs" or "active inputs." For the passive inputs, the system merely monitors the presence or absence of eyes and varies at least one operational parameter accordingly. As examples, a television may be switched "off" if a person leaves a room or closes her eyes for a preselected period of time (e.g., five minutes), or a monitor of a computer system may be switched to a sleep state if eyes are not detected for a different period of time. The controlled device 18 then may be returned to the powered-up state when eyes are detected. For the active inputs, the system monitors eye activity to detect an eye blinking pattern that is correlated with a particular command to vary an operational parameter. Thus, a handicapped person may use blinking patterns to control a wheelchair or other device.

As one possibility of the imager 16, a charge-coupled device (CCD) may be used. Each pixel within a two-dimensional array of elements generates a signal that is based upon the intensity of light received at the pixel, as is well known in the art. Alternatively, the imager may be a complementary metal-oxide semiconductor (CMOS) imager. In general, CMOS imagers are less expensive than CCD detectors and sometimes provide better sensitivity at infrared/near-infrared wavelengths, but the invention works well with either type of imager. Moreover, other types of imagers may be utilized.

The detection light source or sources 12 and the imager 16 are connected to eye detection processing 20, which may be dedicated to the system 10 or may be shared processing, such as system-dedicated software that is executed using circuitry of the controlled device 18. The hardware and software components may be cooperative in a manner consistent with description within U.S. patent application Ser. No. 10/377,687, filed Feb. 28, 2003, of Haven et al., which is entitled "Apparatus and Method for Detecting Pupils" and which is assigned to the assignee of the present invention. Another commonly assigned patent application relevant to implementation is U.S. patent application Ser. No. 10/739,831 of Fouquet et al., which was filed Dec. 18, 2003 and which is entitled, "Method and System for Wavelength-Dependent Imaging and Detection Using a Hybrid Filter." Also of interest is U.S. Pat. No. 6,082,858 to Grace et al., which describes an "Apparatus and Method of Monitoring a Subject's Eyes Using Two Different Wavelengths of Light." The methods disclosed in the two patent documents may be used in monitoring the alertness of a driver of a motor vehicle.

In FIG. 1, frames of image information may be generated by the imager 16 and then manipulated by the eye detection processing 20 to distinguish the eye 14 from other features within the field of view of the imager. It has been determined that a greater reliability is achieved by generating a differential image on the basis of two frames of image information. In this embodiment of high reliability, one of the images is acquired using lighting that is close to or directly on the axis of the detector ("on-axis imaging"), while the other image is acquired using lighting that is at a greater angle to the detector ("off-axis imaging"). When the eyes of a subject are open, the difference between the two images highlights the pupils of the eyes, because the somewhat diffuse reflection from the retinas is detected only in the on-axis image. The strong pupil signal in the on-axis imaging is referred to as "red-eye" in conventional flash photography. Other facial and environmental features are largely cancelled, leaving the pupils as the dominant feature in the differential image. When pupils are not detected in the differential image, it is inferred that there is no person within the imaged area or no person is interested in continued operation of the controlled device 18 (e.g., asleep in the same room as a controlled television). However, other techniques for distinguishing the eye 14 may be substituted.

The eye detection processing 20 is also shown as being connected to a timer 22. The timer represents any known means for enabling time-based determinations by the eye detection processing. For example, if the controlled device 18 is a plasma television, the television may be switched from its powered-on state to a sleep state upon determination that the television has not been viewed for a first preselected period of time (e.g., five minutes) and may be switched from the sleep state to an off state in response to determining that a second period of time (e.g., ten minutes) has expired since the switch to the sleep state. However, a detection of an eye 14 while the television is in the sleep state will return the television to its fully operational powered-on state.

The timing and other aspects of the system 10 may be user configurable. A user input device 24 allows settings to be individualized. In the control of a plasma television, the user input device may be a conventional remote control member that permits an owner to change any of a variety of settings. As another example, the user input device may be a computer mouse or keyboard if the controlled device 18 is a computer system or a component of a computer system.

As another possible feature, the timing may be automatically adjusted by implementing an algorithm that considers factors such as the historical data of occurrences of switching. By way of example, if a person is repeatedly leaving from and returning to a room for a time slightly longer than the first preselected period of time (so that the power consumption state of the controlled device 18 is unnecessarily cycled between two power consumption states), the adaptive algorithm may automatically increase the length of the first period of time.

The eye detection processing 20 may be used to enable active control by a person. Thus, a number of unnatural blinking patterns of an eye 14 may be associated with control commands for the controlled device 18. Four rapid blinks may be used to turn the controlled device "on" and "off." Volume control and control of other operational parameters may be incorporated. In FIG. 1, the commands may be stored within a database format 26. That is, the database or other storage format may be used to provide access to preselected correlations between blinking patterns and the commands. When the eye detection processing 20 recognizes a particular unnatural blinking pattern, the associated command is generated by a controller 21 and is implemented at the controlled device.

In effect, the blinking patterns for the active control by a person are codes. The codes may be simple, but may include some complexity if the control system 10 is to be used in a security environment. Conventional Morse code is one possibility. Another possible feature for a security application is a second level of eye recognition, wherein the identity of the person is verified by the identification of individualized characteristics of the person's eye or eyes, similar to the use of a fingerprint. Then, the active control of the controlled device 18 may be limited to a selected person or a small number of people.

Automatic power consumption regulation over the controlled device 18 may be desirable for any one of a number of different reasons or may be desirable for a combination of reasons. A power-down feature that occurs automatically provides a power savings. For a battery-operated device, this will extend the life of the battery charge. Moreover, many televisions and other power-intensive consumer electronic devices can be more closely limited to operation during those times in which there is a benefit to use. This provides cost and ecological benefits, as well as a potential extension of the useful life of the device. Convenience is another possible reason for providing the automated power management. This is particularly likely for controlled devices that provide "task illumination," such as an interior light of an oven. In the task illumination applications, the determination is made with regard to the viewing of an area, rather than the viewing of the controlled device itself. For the embodiments that utilize active control via blinking patterns, the control does not require the continued availability of a remote control unit. Moreover, an automatic shut-down of a television when a viewer falls asleep does not require the viewer to initiate the feature.

Figure 2:
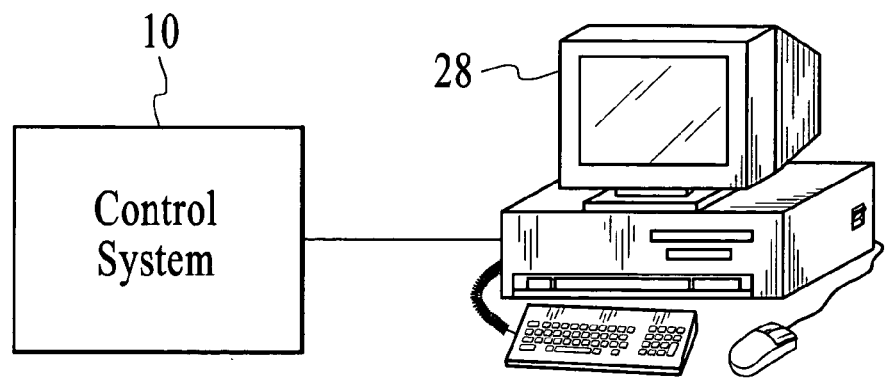
FIG. 2 is a schematic diagram of the control system of FIG. 1 connected to a computer system.
Figure 3:
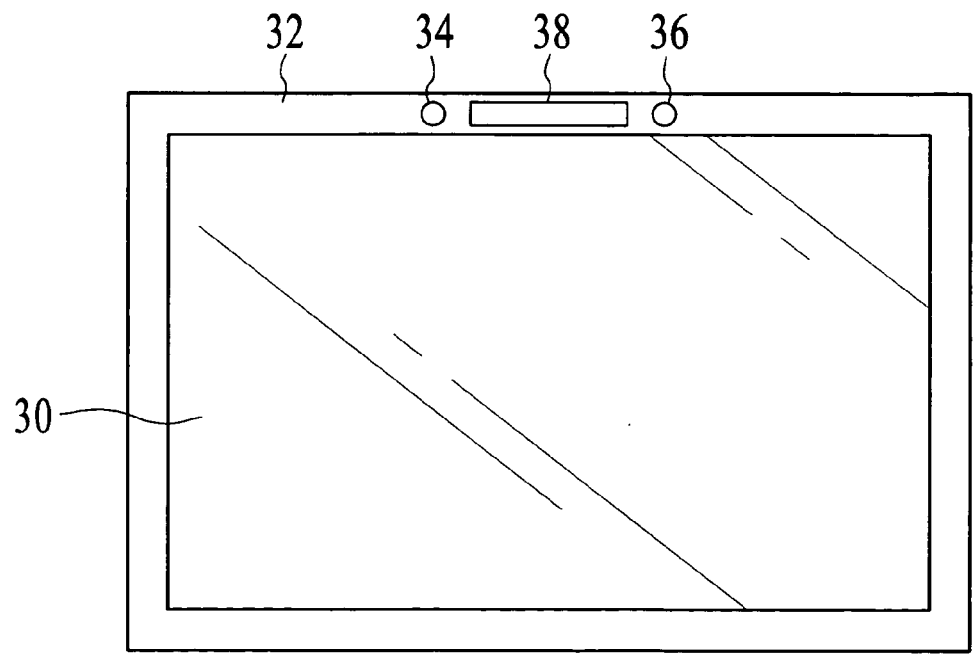
FIG. 3 is a front view of a television screen, display screen, or two-state window which has been adapted to include the control system of FIG. 1.
Figure 4:
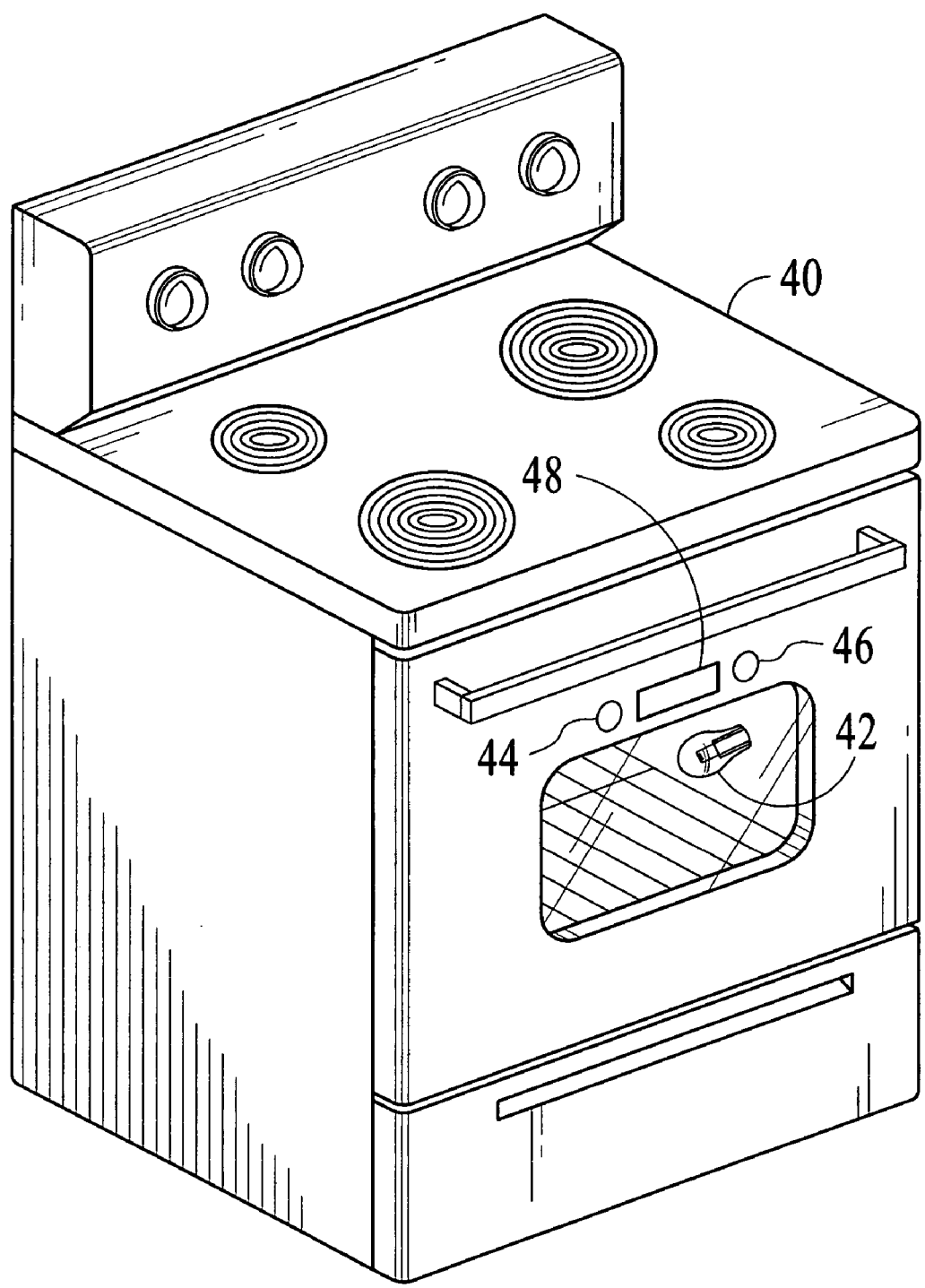
FIG. 4 is perspective view of an oven which has been adapted to include the control system of FIG. 1.

FIGS. 2, 3 and 4 illustrate examples of applications of the control system 10. In FIG. 2, the system is connected to a computer system 28. As one possibility, the "controlled device" is merely the monitor of the computer system, rather than the entire computer system. Alternatively, or additionally, the processing capabilities of the computer may be controlled on the basis of eye detection. Typically, the control system 10 is incorporated into the computer system, rather than being an external component as shown in FIG. 2. When used in a laptop computer, the control system will often increase the time between battery recharges.

In FIG. 3, the "controlled device" includes a display screen 30. The display screen may be a portion of a cellular telephone or personal digital assistant, or may be a larger unit, such as a plasma television or the display of a laptop computer. Within the frame 32 surrounding the screen are first and second light sources 34 and 36 and a two-dimensional imager 38. If the screen is a component of a cellular telephone, the field of view of the imager 38 may be relatively limited, as compared to an acceptable field of view of an imager for the television application. Similarly, the lights from the light sources 34 and 36 may be more focused in some applications as compared to others. In the television application, the light is "broadcast" to cover the range of viewing angles to the television screen.

Alternatively, FIG. 3 may be considered to be a two-state window that is controllable. For example, the polarization of a window of an office or home may be automatically switched between states, depending upon the presence or absence of persons who will be affected by the switch. There are potential security and health benefits to this automatic switching.

FIG. 4 illustrates an oven 40 having an interior light 42 and having first and second light sources 44 and 46 on opposite sides of an imager 48. The imager and the light sources are directed to determine occasions in which a person is positioned to view the interior of the oven. Upon such occasions, the interior light is turned to its "on" state. On the other hand, when the image information acquired by the imager indicates that the interior of the oven is not within the line of sight of an individual, the interior light remains "off."

Figure 5:
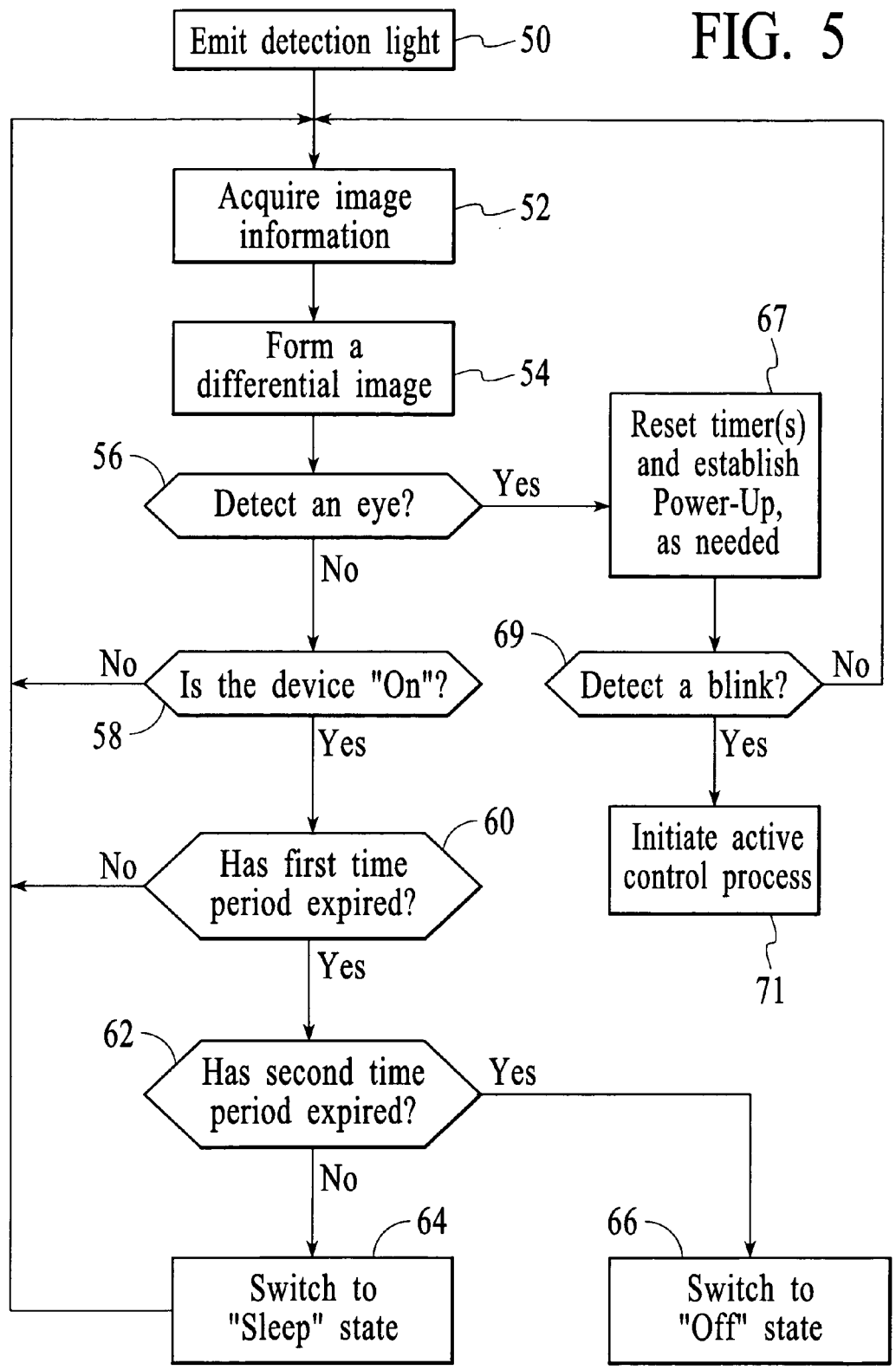
FIG. 5 is a process flow of steps of one implementation for utilizing the system of FIG. 1.

FIG. 5 is one embodiment of a process flow of steps for implementing the invention. At step 50, detection light is emitted. As previously noted, this step may be omitted in those applications in which reliable detection can occur without artificially generating light at the detection wavelength. Conversely, the step is critical to some embodiments.

In step 52, the image information is acquired. Frames of image information are generated at sample times of the imager of the control system. The sample times may be continuous, but some applications benefit from non-continuous monitoring for eye detection. For example, in a battery-powered appliance, monitoring may occur for one second every two minutes, thereby reducing power consumption by a factor of 120. As one possible means for detecting a human eye, a differential image may be formed from a pair of image frames, as indicated at step 54. An approach to forming the differential image for the purpose of detecting an eye will be described in greater detail below, when referring to FIGS. 6, 7, 8 and 9.

In decision step 56, it is determined whether the differential image formed at step 54 indicates the presence of an eye within the field of view of the system's imager. If the differential image does not include evidence of an eye, the process progresses to step 58. When the controlled device is "off" and the differential image does not evidence an eye, the process merely loops back to step 52. On the other hand, if the device is "on" and is subject to power management control, the process reaches step 60. Here, a determination is made as to whether a first predetermined time period has expired. In the previously described example, this first time period may be a five minute limit since the last time a person (i.e., an eye) was in a position to view the controlled device, such as a television. Thus, with each affirmative determination at step 56, the first timer is reset (step 67). On the other hand, until the time limit since the last reset has been exceeded, each negative response at step 56 and affirmative response at step 58 will lead to a negative response at step 60, so that the process loops back to the steps 52 and 54 of acquiring image information and forming a new differential image. However, after the expiration of the first time period, the next determination that a differential image does not include an image of an eye will result in the power management system switching the power consumption state of the controlled device. This automatic switching may be from an "on" state to an "off" state. Alternatively, the controlled device may have more than two power consumption states, so that it may be relevant whether a second time period has expired. In the embodiment of FIG. 5, the process includes two time periods.

Each affirmative response at the step 60 of determining whether the first time period has expired is followed by a similar step 62 of determining whether the second time period has expired. The combination of steps 60 and 62 provides three timing possibilities. As a first possibility, neither time period has expired, so that a negative response occurs at step 60 and the process loops back to steps 52 and 54. As a second possibility, the first time period has expired, but the second has not. According to this possibility, the process progresses to the step 64 of automatically switching the controlled device to its sleep state. Of course, if the second time period is sufficiently long, the process will continuously return to step 64, but the switch will only occur at the first visit. The process loops back to the steps 52 and 54 of acquiring image information and forming a differential image, which is then processed for eye detection.

The third timing possibility with regard to the decision steps 60 and 62 is the one in which both time periods have expired. As a result, the controlled device will be switched again, this time from its sleep state to its off state. This second switch is represented at step 66. Optionally, the control system may be programmed to return the controlled device to its on state if an eye detection occurs after the device has been switched off. This would occur at step 67. Alternatively, in order to prevent undesired switches from the off state, the unnatural blink pattern recognition processing (steps 69 and 71) may be required for a switch of this type.

Returning to step 56, if there is evidence of an eye within the differential image formed at step 54, timers are reset as needed, as indicated at step 67. For example, if the controlled device is turned on and includes the first and second time periods that were described when referring to steps 60 and 62, the timer or timers are reset to zero. Also at step 67, if the device is in the sleep mode, it will be switched to its power-up state. The process then progresses to decision step 69 of detecting a blink, if the application of the invention includes active control. The initial blink detection may require a number of differential images to be compared.

After a blink is detected at step 69, the active control processing is initiated at step 71. This may involve terminating the frame-to-frame analysis and initiating a data stream analysis. The eye or eyes of the individual may be specified with respect to location within the imager's field of view and monitored to determine whether eye activity matches one of the preselected blinking patterns. Correlations between blinking patterns and commands for varying operational parameters of the controlled device 18 of FIG. 1 are stored within the database 26. After a blinking pattern has been recognized by the eye detection processing 20, an output is generated that causes the controller 21 to issue the appropriate command to the controlled device.

In addition to the correlations between blinking patterns and commands for varying operational parameters of the controlled device 18, the database 26 may include correlations between a particular eye 14 and the particular person. As previously noted, the physical characteristics of an eye may be used in the same manner as the physical characteristics of a finger-print in identifying a person. Optionally, active control may be restricted to a limited number of people.

It has been determined that a greater reliability with regard to eye detection is achieved by generating a differential image on the basis of two frames of image information, with one frame being acquired using on-axis imaging and the other being acquired using off-axis imaging. One embodiment of such an approach is illustrated in FIGS. 6, 7, 8 and 9. In FIG. 6, the eye of a subject 68 is illuminated using a first light source 70 and a second light source 72. For clarity of illustration, the first light source 70 and the second light source 72 are shown on opposite sides of a detector 74. However, it is appreciated that the two light sources may instead be on the same side of the detector.

A key principle in obtaining differential reflectivity from the retina of an eye is the dependence of retinal reflectivity on the angle between the source and the detector. This angle may be referred to as the "illumination angle." The selection of a position of a light source 70 and 72 relative to the detector 74 is subject to additional considerations. To achieve successful differencing of the images so as to yield spots corresponding to the reflecting retina, it is desirable for the remainder of the field of view to have sufficiently similar illumination profiles under the two different angles of illumination. In the application of the system to control switching of the power consumption states of a television, this "remainder of the field of view" may include the face of the subject, the apparel of the subject, and the interior of a living room. Thus, it is desirable for illumination from a single-side, on-axis light source to produce shadows that are significantly different than the shadows produced by a second off-axis light source.

In FIG. 6, the first light source 70 is situated at a first illumination angle 76 from the axis 80 of the detector 74, while the second light source 72 is situated at a second illumination angle 78. In general, a smaller first illumination angle will decrease the retinal return. As used herein, the "retinal return" refers to the intensity (i.e., the real photon count or the equivalent) that is reflected from the back of the eye and that is received at the detector. As one possibility, the first illumination angle 76 is in the range of approximately zero degrees to three degrees.

In general, the size of the second illumination angle 78 is chosen so that only low retinal return from the second light source 72 will be detected at detector 74. The iris surrounding the pupil tends to block this signal, so that pupil size should be considered under different lighting conditions when selecting the second illumination angle 78. This second angle is larger than the first illumination angle 76. However, the second angle should be only slightly larger than the first angle so that, with the exception of the pupil, an image captured using the second light source will be similar to an image captured using the first light source. Accordingly, in one embodiment, the second illumination angle is in the range of approximately three degrees to fifteen degrees.

The first and second light sources 70 and 72 may emit light at generally equal intensities. However, there may be applications in which it is desirable for the light sources to emit light at different intensities. More likely, there are applications in which the light sources are designed to emit light at different wavelengths, so that the original images for forming the differential image can be formed on the basis of the difference in wavelengths. The wavelengths and/or illumination intensities of light emitted from the light sources are selected so that the light will not distract the subject and so that the iris of the subject's eyes will not contract in response to the light. A desirable selection is the use of infrared or near-infrared light sources.

In capturing two frames which are to be used to generate the differential frame, the first frame may be generated by illuminating and sampling the detector 74 at a time prior to illuminating and sampling the detector so as to generate the second frame. However, as an alternative to this temporal difference in frame formation, there may be a spatial difference with respect to pixels within a two-dimensional array of detector pixels. For example, adjacent pixels within the detector may be physically distinguishable in a manner that allows frame differencing to yield usable information regarding presence or absence of an eye. Thus, if the signals from adjacent pixels have distinguishable polarization dependencies, one pixel may be used as part of a first frame, while the adjacent pixel is used in sampling to form a second frame. Each sampling can be coded to identify its polarization dependency. The proper optical elements between the eye of the subject 68 and the detector 74 may also be used to enable spatial differentiation in frame form ation from a single illumination.

FIG. 7 illustrates an image of an open eye, where the image is generated using the on-axis light source 70. The on-axis illumination angle results in the image having a bright pupil 84, as a result of the strong retinal return.

FIG. 8 illustrates an image of the open eye 82, but with an off-axis illumination angle, so that there is a dark pupil 86. The images of FIGS. 7 and 8 may be generated simultaneously or may be formed in successive frames of image information from a single detector.

FIG. 9 illustrates a differential image resulting from the difference between the two frames of image data generated using the on-axis and off-axis light sources 70 and 72. By taking the difference between the images of FIGS. 7 and 8, a relatively bright spot 88 will remain against the relatively dark background 90 when the eye is open. There may be vestiges of other features of the eye remaining in the background 90 but, in general, the bright spot will stand out in comparison to the background. When the eye is closed or nearly closed or when no subject is within the field of view of the detector 74 during the acquisition of the image data for forming FIGS. 7 and 8, there will be no bright spot or the bright spot will be partially deleted in the differential image. Thus, the power management system may be used to automatically switch a television off when a person falls asleep.

FIGS. 7, 8 and 9 target one eye of the subject. It should be appreciated that both eyes may be monitored. It should also be appreciated that a similar effect may be achieved if the images include other features of the subject and/or features of the subject's environment. These other features will largely cancel out in a similar manner to many of the features of the eye, so that only the bright spot 88 will remain within the differential image.

Light from the two light sources 70 and 72 may be emitted in pulses that are synchronized with the frame rate of the detector 74. For example, if the detector operates at a frame rate of thirty frames per second, the light is emitted at a rate of thirty pulses per second. However, it is not necessary that the pulsing occurs continuously. For example, if the frame rate is thirty frames per second, four pulses may be emitted for four/thirtieth of a second, with no light pulses being emitted over the remaining twenty-six/thirtieth of the second. It is possible for sufficient information to be collected during the small portion of the second, with a reduced likelihood of distracting the subject.

The light from the light sources 70 and 72 of FIG. 6 may or may not be of the same wavelength. In an embodiment in which light is emitted at essentially the same wavelength, the light sources may be activated at different times. That is, for example, a pulse may be emitted from the first light source 70, followed by a pulse from the second light source 72, and so on for the length of a burst. In general, it is desirable for the light sources to alternate emitting light pulses, so as to generate consecutive on-axis and off-axis frames of image information. For example, even-numbered frames may be associated with pulses of the first light source, while odd-numbered frames are associated with pulses of the second light source. Since the frame acquisition is rapid, the images will be very similar, reducing motion artifacts and thereby facilitating the process of finding the difference between any two consecutive frames.

As an alternative to forming a differential image on the basis of two consecutively acquired frames of information, the image frames may be simultaneously collected. This is possible if the image data collection is distinguished by optical property, such as wavelength, modulation, or polarization. For example, if the light emitted from the first light source 70 of FIG. 6 is at a different wavelength from the light emitted from the second light source 72, the light may be emitted at essentially the same time. In one such embodiment, the wavelength that yields the strongest retinal return is used by the light source closest to the detector 74. Measured on a conventional silicon-based detector, the retinal return signal is typically stronger at wave-lengths of 800 nanometers (nm) versus 950 nm. In general, it is more desirable to associate the shorter wavelength with the on-axis light source.

Modulation may also be used to enable distinguishing the light from the two light sources. For example, a synchronous (lock-in or phase sensitive) detection approach may be applied. Generally, in a synchronous detection approach, a light source (for example, a laser) is passed through a "chopper," which modulates the light at a selected frequency. Direct electrical modulation of certain light sources, such as semiconductor light emitting diodes, is also possible. The synchronization output of the chopper, modulated at the selected frequency, is input to a lock-in amplifier. The signal received by the detector 74 is also input to the lock-in amplifier. The lock-in amplifier mixes the synchronization output of the chopper with the optically detected signal. A narrow band filter (around the selected frequency) is applied, yielding a signal at approximately the selected frequency. As a result, the signal may be distinguished from signals modulated at a different selected frequency and signals which are unmodulated.

When the light is emitted from both light sources 70 and 72 at essentially the same time, the on-axis and off-axis frames will be acquired essentially simultaneously by the detector 74 or a pair of wavelength-selective detectors. As a result, motion artifacts can be eliminated and any timing constraints placed on the detector can be relaxed. Furthermore, the timing between consecutive measurement cycles can be less critical. This allows the time between consecutive measurement cycles to be increased without jeopardizing the reliability of the process. For example, images can be acquired once per second, rather than four times per second. The advantages that are realized by increasing the measurement cycle include increased sensitivity to the captured images, reduced image handling requirements, lower cost, and decreased exposure of the subject.

Using different wavelengths for the two light sources 70 and 72, the on-axis and off-axis frames can be acquired using various methods. Some of these methods include using bulk optics, while others use sensors with pixel-based filters.

Polarization is an alternative basis for separating the two signals. In one embodiment, the first light source 70 emits light that is polarized in one direction, while the second light source 72 emits light polarized in an orthogonal direction. Typically, two detectors are used, rather than the single detector 74 shown in FIG. 6. Appropriate polarizers can be positioned in front of the detectors or a polarizing beam splitter can be used.

While FIGS. 6–9 illustrate one possible embodiment of the positioning of various system components and one possible embodiment of eye detection processing, modifications may be made without diverging from the invention. The method and system may be modified on the basis of the application, so as to maximize the advantages provided by the invention.

What is claimed is:

1. A control system for a device comprising:
   an imager and eye detection processing for detecting light received by said imager from a human eye, said eye detection processing being configured to generate an output indicative of determinations of detecting said human eye; and
   a controller enabled to switch said device among a plurality of power consumption states in response to said output of said eye detection processing, said controller being configured to execute both of a first conditional response and a second conditional response, wherein
   (a) said first conditional response is one in which said device is switched from a power-up state to a lower power consumption state upon passage of a first time period without detecting a human eye; and
   (b) said second conditional response is one in which said device is switched to said power-up state upon detection of a human eye, said controller including a control algorithm which adaptively adjusts said first time period on a basis of factors that include historical data of occurrences of switching by said controller.

2. The control system of claim 1 wherein said device has at least three said power consumption states, including a power-off state, a sleep state and said power-up state, wherein said controller is set to switch said device from said power-up state to said sleep state upon passage of said first time period without detecting a human eye.

3. The control system of claim 2 wherein said controller is further set to switch said device from said sleep state to said power-off state upon passage of a second time period without detecting a human eye.

4. The control system of claim 3 wherein said controller is configured to switch said device from said sleep state to said power-up state upon detection of a human eye.

5. The control system of claim 2 wherein said controller is further configured to switch said device from said power-off state to said power-up state upon detection of a human eye.

6. The control system of claim 1 wherein said controller enables adjustment of said first time period by a user.

7. The control system of claim 1 wherein said control algorithm adaptively increases said first time period on a basis of historical a data indicating repeated occurrences of switching by said controller.

8. The control system of claim 1 wherein said controller is connected to an electronic device that includes a display screen, said electronic device being said device having said plurality of power consumption states, said imager being in a fixed location relative to said device being controlled.

9. The control system of claim 8 wherein said electronic device is one of a computer system and a video display system.

10. The control system of claim 1 wherein said controller is further configured to switch said device among said power consumption states In response to detecting predetermined eye blinking patterns, said patterns being interpreted by said controller as commands.

11. The control system of claim 10 wherein said controller is connected to provide switching for illumination of a specific area.

12. The control system of claim 10 wherein said predetermined eye blinking patterns include patterns interpreted by said controller to trigger witching between an "on" state and an "of" state.

13. The control system of claim 1 further comprising storage of correlations between specific commands and predetermined eye blinking patterns, said commands including device-adjustment commands unrelated to said switching among said power consumption states, said eye detection processing being enabled to recognize said patterns and said controller being configured to implement said commands upon recognitions of said patterns.

14. The control system of claim 13 wherein said eye detection processing is programmed such that an eye closure is detected using at least one frame of image information and such that detection of said eye closure triggers a change from eye recognition via analysis of frames to blink pattern detection via analysis of streaming image data.

15. The control system of claim 1 further comprising at least one stored correlation between a particular person and image information that is specific to an eye of said particular person, wherein operations of said eye detection processing are dependent upon recognizing a person.

16. A control System for a device comprising:
   an imager and eye detection processing for detecting light received by said imager from a human eye, said eye detection processing being configured to generate an output indicative of determinations of detecting said human eye, said imager being sampled in a non-continuous basis, with a sampling frequency selected to conserve battery charge; and
   a controller enabled to switch said device among a plurality of power consumption states in response to said output of said eye detection processing, said controller being configured to execute both of a first conditional response and a second conditional response, wherein
   (a) said first conditional response is one in which said device is switched from a power-up state to a lower power consumption state upon passage of a first time period without detecting a human eye; and
   (b) said second conditional response is one in which said device is switched to said power-up state upon detection of a human eye, said controller including a control algorithm which adaptively adjusts said first time period on a basis of factors that include historical data of occurrences of switching by said controller.

17. A control system for a device comprising:
   an imager and eye detection processing for detecting light received by said imager from a human eye, said eye detection processing being configured to generate an output indicative of determinations of detecting said human eye; and
   a controller enabled to switch said device among a plurality of power consumption states in response to said output of said eye detection processing, said controller being configured to execute both of a first conditional response and a second conditional response, wherein
   (a) said first conditional response is one in which said device is switched from a power-up state to a lower power consumption state upon passage of a first time period without detecting a human eye; and
   (b) said second conditional response is one in which said device is switched to said power-up state upon detection of a human eye, said controller including a control algorithm which adaptively adjusts said first time period on a basis of factors that include historical data of occurrences of switching by said controller, wherein said control algorithm adaptively increases said first time period on a basis of historical data indicating repeated occurrences of switching by said controller.

* * * * *

UNITED STATES PATENT AND TRADEMARK OFFICE
CERTIFICATE OF CORRECTION

| | | |
|---|---|---|
| PATENT NO. | : 7,091,471 B2 | Page 1 of 1 |
| APPLICATION NO. | : 10/801014 | |
| DATED | : August 15, 2006 | |
| INVENTOR(S) | : Wenstrand et al. | |

It is certified that error appears in the above-identified patent and that said Letters Patent is hereby corrected as shown below:

In column 12, line 46, in Claim 7, after "historical" delete "a".

In column 12, line 58, in Claim 10, delete "In" and insert -- in --, therefor.

In column 12, line 66, in Claim 12, delete "witching" and insert -- switching --, therefor.

In column 12, line 67, in Claim 12, delete ""of"" and insert -- "off" --, therefor.

In column 13, line 20, in Claim 16, delete "System" and insert -- system --, therefor.

Signed and Sealed this

Thirtieth Day of January, 2007

JON W. DUDAS
*Director of the United States Patent and Trademark Office*